United States Patent [19]

Eckert et al.

[11] Patent Number: 4,475,524
[45] Date of Patent: Oct. 9, 1984

[54] DEVICE FOR ADMITTING EXHAUST GASES AND FUEL-AIR MIXTURES INTO THE CYLINDERS OF AN INTERNAL COMBUSTION ENGINE

[75] Inventors: Konrad Eckert, Stuttgart; Klaus Müller, Tamm; Ernst Linder, Mühlacker; Wilhelm Polach, Möglingen; Heinz Britsch, Bietigheim-Bissingen, all of Fed. Rep. of Germany

[73] Assignee: Robert Bosch GmbH, Stuttgart, Fed. Rep. of Germany

[21] Appl. No.: 246,965

[22] Filed: Mar. 24, 1981

[30] Foreign Application Priority Data

Mar. 26, 1980 [DE] Fed. Rep. of Germany ....... 3011580

[51] Int. Cl.³ .............................................. F02B 47/08
[52] U.S. Cl. .................................................... 123/568
[58] Field of Search ................................ 123/568, 569

[56] References Cited

U.S. PATENT DOCUMENTS

| | | | |
|---|---|---|---|
| 1,632,881 | 6/1927 | Burtnett | 123/568 |
| 2,354,179 | 7/1944 | Blanc | 123/568 |
| 3,186,392 | 6/1965 | Gregoric | 123/568 |
| 4,119,071 | 10/1978 | Hattori | 123/568 |
| 4,198,940 | 4/1980 | Ishida | 123/568 |
| 4,214,562 | 7/1980 | Mowbray | 123/568 |
| 4,306,533 | 12/1981 | Matsumoto et al. | 123/568 |

Primary Examiner—Craig R. Feinberg
Assistant Examiner—W. R. Wolfe
Attorney, Agent, or Firm—Edwin E. Greigg

[57] ABSTRACT

A device is proposed for the supply of operating air-fuel mixtures including exhaust gases to internal combustion engines. Between the opening periods of the inlet valves of an internal combustion engine, precisely dispensed quantities of recirculated exhaust gas are pre-stored in the intake channel directly upstream of the inlet valve whereby a stratification of exhaust gas and fuel-air mixture in the combustion chamber of the engine is obtained.

7 Claims, 3 Drawing Figures

DEVICE FOR ADMITTING EXHAUST GASES AND FUEL-AIR MIXTURES INTO THE CYLINDERS OF AN INTERNAL COMBUSTION ENGINE

BACKGROUND OF THE INVENTION

The invention is based on a device for admitting exhaust gases and fuel-air mixtures into the cylinders of an internal combustion engine. In a known device of this type, air or exhaust gas is delivered, together with the fuel-air mixture, to the combustion chamber of an internal combustion engine during a first portion of the intake stroke. During the second portion of the intake stroke, only the fuel-air mixture is then aspirated; the mixture is thus richer and has greater ignitability. The intention is thus to attain a stratification of the charge in the combustion chamber of the engine, so that at the instant of ignition the mixture which is present at the ignition location will have a better capacity for ignition. An object of this device is the operation of an internal combustion engine with a relatively lean mixture as a whole. However, in the known device, the supplementary air is introduced into the intake channel through a narrow slit, and this slit imparts the speed of sound to the inflowing medium at the instant of its entry into the intake tube; this is intended to bring about thorough mixing of the inflowing fuel-air mixture. However, this portion of the charge, which has been leaned down greatly by the supplementary air or by the admixture of exhaust gas and is thus less ignitable, is also intended for combustion; as a result, narrow limits are placed upon the admixture of recirculated quantities of exhaust gas. The slit-like embodiment of the inflow cross section also dictates that the quantity of the supplementary medium will decrease when the total fuel mixture increases, or when engine rpm is increasing. When approaching full-load operation as well, the increasing absolute pressure in the intake tube reduces the supply of the supplementary medium. This may well be desirable for the sake of fully exploiting the charge which has been introduced during full-load operation into the combustion chamber; however, in the other load ranges of the engine, it makes it less possible to reduce exhaust emissions by means of high exhaust recirculation rates.

OBJECT AND SUMMARY OF THE INVENTION

The device according to this invention has the advantage over the prior art that the desired quantity of exhaust gas for recirculation is pre-stored in the portions of the intake channel adjoining the inlet valve downstream therefrom before the inlet valve is opened. Fresh air is aspirated only after this measured exhaust quantity is introduced, and the fuel is then admixed thereto. In this the load control of the engine can be performed not by throttling the aspirated air or the aspirated mixture, but instead by varying the ratio of the fuel and air components of the charge to be recirculated exhaust component of the charge. Thus, in an advantageous manner, engine throttling losses are reduced and the extent of filling is improved while maintaining the same delivery of fuel or energy.

Because the exhaust gas is introduced into the combustion chamber first, a stratification of the ballast substance (exhaust gas) occurs with respect to the fresh air and the fuel at the ignition location, this produces a fuel-air mixture at the moment of ignition which in fact has good ignitability.

As a result of the characteristics disclosed herein, advantageous modifications of the device disclosed in the main embodiment are attainable.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
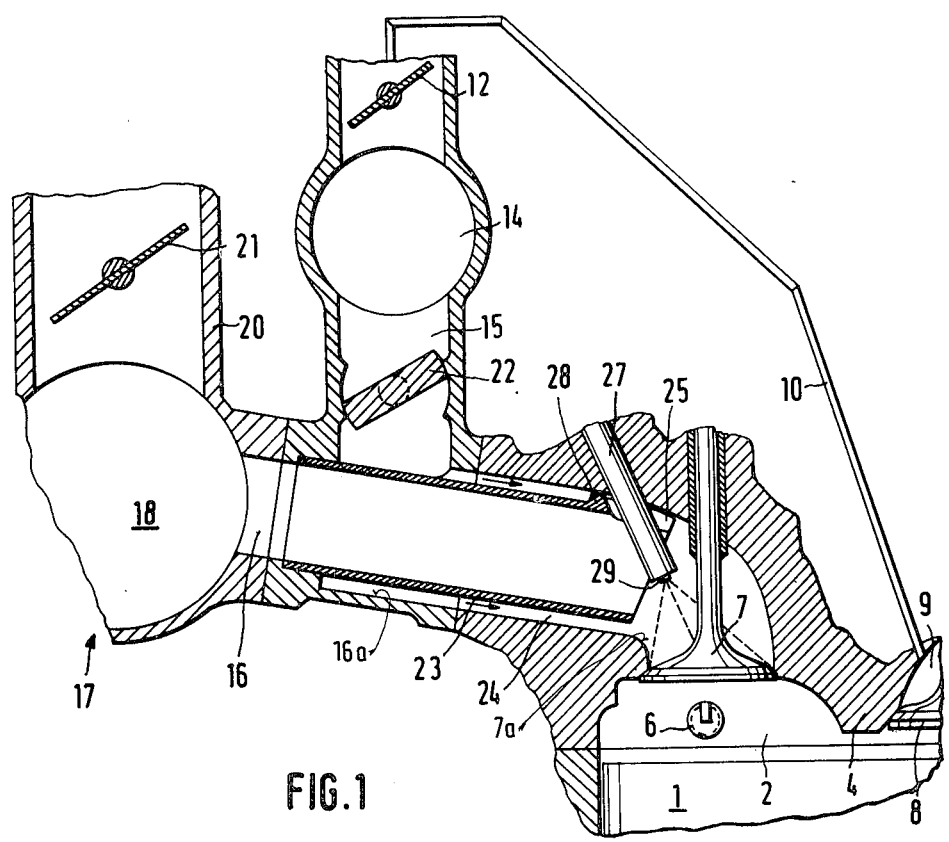
FIG. 1 shows a first exemplary embodiment of the invention which has a controlled recirculation of exhaust gas via a tube of annular cross section disposed in the intake channel.

FIG. 1 is a detail illustration showing those elements of an internal combustion engine which are essential to understanding the invention. Part of a piston 1 is shown, which encloses a combustion chamber 2 in the cylinder of an internal combustion engine. This combustion chamber 2 has a spark plug 6 and is supplied with operating fuel-air mixture via an inlet port 7a and inlet valve 7. An outlet valve 8 operative in exhaust port 4 connects the combustion chamber 2 with the exhaust outlet channel 9 of which only a very small part is shown. Connected with and leading away from the exhaust outlet channel is an exhaust recirculation line 10, which includes therein a throttle device for varying the free cross section of the exhaust recirculation line taking the form of an exhaust throttle valve 12. An exhaust manifold container 14 is incorporated downstream of this exhaust throttle valve, and a partial passage 15 of the exhaust recirculation line leads from the container 14 and connects with an intake channel 16a which joins intake channel 16 of the intake system 17. The intake channel 16 branches off from an intake distributor 18 and leads directly to inlet channel 16a which extends to the inlet valve port 7a. One intake channel 16 and one partial passage 15 of the exhaust recirculation line 10 is provided for each cylinder of the engine. The supply of air—or, in a different embodiment, the supply of the fuel-air mixture—to the intake distributor 18 is effected in the conventional manner via an intake tube 20 in which a main throttle valve 21 of conventional embodiment is disposed.

A rotary slide 22 is disposed in the partial passage 15 and acts as the passage control device. The rotary slide is driven in synchronism with the engine rpm and it opens or closes the cross section of the partial passage 15 in accordance with the control stroke. The passage control device 22 must not necessarily by a rotary slide, however; it may be embodied in some other suitable manner instead, being a valve controlled by a cam or magnetic means, for instance. The intake channel is larger in diameter from the connection of the partial passage 15 with intake channel 16a to the intake port 7a and includes therein a tubular sleeve 23 coaxial with the larger diameter portion 16a. The tubular sleeve 23 is firmly connected in tubular channel 16 and has an inner diameter which is the same as inlet channel 16. The outer diameter of sleeve 23 is less than the diameter of channel 16a and provides an annular passage or channel 24 of annular cross section between the outer jacket of the guide tube and the wall of the intake channel 16a. The partial passage 15 discharges into this annular channel 24. The guide tube 23 terminates just before the inlet valve 7 and has a recess 25 at that location through which the neck of a fuel injection valve 27 protrudes into the intake channel 16a. The guide tube 23 may have reinforcing ribs 28 in the vicinity of this downstream end in order to secure the coaxial position of the guide tube 23.

The fuel injection valve 27 is disposed such that when the inlet valve 7 is opened the fuel streams ejected from the nozzle openings 29 in fuel injection valve 27 pass in front of the downstream end of sleeve 23, through the free annular gap, and directly into the combustion chamber 2.

Figure 2:
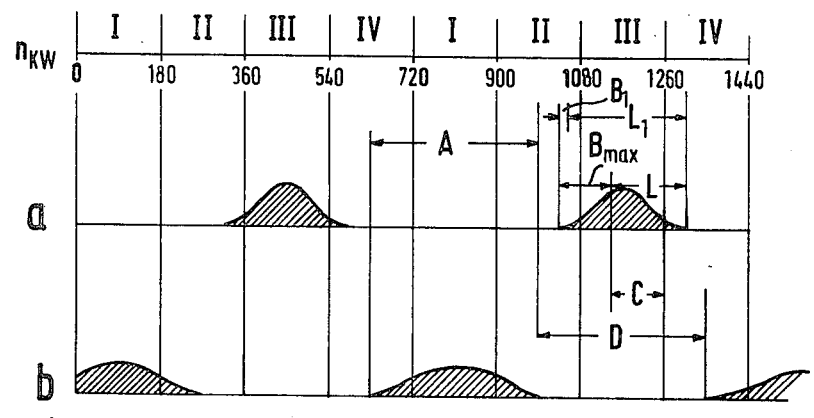
FIG. 2 is a control diagram of the passage control device provided in the exhaust recirculation line partially shown in schematic form.

The mode of operation of the apparatus described above will now be described with the aid of the diagram given in FIG. 2. The diagram shows two complete cycles of the four working cycles for one of the cylinders of an engine of a four-stroke internal combustion engine, having crankshaft rotation angles from 0 to 1440 degrees. The valve elevation curves of the inlet valve 7 are plotted on line a, at various times during the intake stroke between approximately 360° and 540° or between 1080° and 1260° (III). Below this, on line b, the control times of the rotary slide 22 are plotted in like manner. It is evident that the rotary slide 22 is controlled such that the times during which it opens the cross section of the partial line 15 are disposed between the opening times of the inlet valve 7. The opening time A of the inlet valve 7 is dimensioned such that the partial line of the exhaust recirculation line will assuredly be closed whenever the inlet valve 7 begins to open. This means that during the opening time A of the rotary slide 22, it is possible for a quantity of exhaust gas which is substantially determined by the position of the exhaust throttle valve 12 to reach the intake channel 16. The guide tube 23 here assures that the recirculated exhaust gas arrives in the immediate vicinity of the inlet valve 7, and from there the exhaust gas fills up the intake channel, with a predetermined quantity of exhaust gas over the period that the rotary slide 22 is opened. The result is that it is exclusively exhaust gas which is placed in preliminary storage ahead of the inlet valve. Now if the inlet valve 7 is opened with the beginning of the intake stroke of the inlet valve, then the pre-stored exhaust gas first reaches the combustion chamber 2 and is deposited over the piston head. Following entry of the pre-stored exhaust gas, fresh air is then supplied, and fuel is added to the fresh air during the last portion of the intake stroke as the result of injection by way of the fuel injection valve. Thus the result at the end of the intake stroke is a stratification such that exhaust gas lies directly above the piston bottom, while a mixture of fresh air and fuel of ignitable quality is located in the region of the spark plug 6.

As a result of this stratification at the end of the subsequent compression stroke, an ignitable fuel-air mixture which is substantially unaffected by the introduced exhaust gas is present at the spark plug 6. In this manner, relatively high exhaust recirculation rates can be attained; without such stratification, ignition would hardly be possible at such rates, given the homogeneous mixing of the components which would then occur. Since the control times of the rotary slide 22 are firmly set, the pre-stored exhaust recirculation quantity is dependent upon the pressures in the intake channel 16 and in the exhaust recirculation line 10. Influence can be exerted first via the exhaust throttle valve 12 and second via the main throttle valve 21. The duration of the intake times given at B in the control diagram of FIG. 2, at which times it is exclusively the pre-stored exhaust gas which is aspirated, is dependent upon the quantity of the pre-stored exhaust gas. The pre-stored exhaust gas is limited by the duration of fuel injection provided in this exemplary embodiment; for this, the time C shown in the diagram is required. Since fuel injection must be effected through the free annular gap at the inlet valve 7, the end of this injection time is fixed. How long injection occurs before the closure of the inlet valve depends on the embodiment of the injection nozzle and on the quantity of fuel to be injected. It must be assured that the fuel is injected exclusively into the aspirated fresh air.

With the described embodiment and control of the recirculated exhaust gas quantity, it is possible to perform the load control of the engine substantially by means of precisely dispensing the recirculated exhaust gas quantity. Thus, with a good filling extent, losses resulting from throttling of the intake air are reduced and an increase in the thermodynamic efficiency is attained. As a result of the good filling extent, high compression pressure is attained as well as a high temperature in the mixture to be ignited; this increases its ignitability. The locally stoichiometric fuel-air mixture, despite its lean mixture composition, provides favorable conditions for ignition and for combustion. The associated additional increase in efficiency also reduces fuel consumption. Particularly at partial load, the actual combustion area in the combustion chamber is reduced in size by the recirculated exhaust gas component, so that losses are kept low. The recirculation of exhaust gas furthermore keeps the $NO_x$ emissions low.

Although the direct injection of fuel in the last portions of the fresh-air charge greatly improves conditions for attaining a stoichiometric, ignitable mixture in the vicinity of the spark plug, it is also possible to supply the fuel in a different manner, on the same principle of stratification of quantities of recirculated exhaust gas. This may either be done in a conventional manner, by means of fuel delivery in the intake system upstream of the pre-stored exhaust gas quantity, or it may also be done by the delivery of fuel into an ignition chamber 31 in accordance with the exemplary embodiment of FIG. 3. Ignition chambers of this kind are known; in mixture-compressing internal combustion engines, such chambers have a spark plug 6'. The fuel can either be directly injected into ignition chambers of this kind with the aid of an injection valve 32, or fuel can be delivered in the form of a rich fuel-air mixture via a separate mixture generator by suitable control means. The ignition chamber communicates with the main combustion chamber 2 of the engine by way of one or more overflow channels 33.

Figure 3:
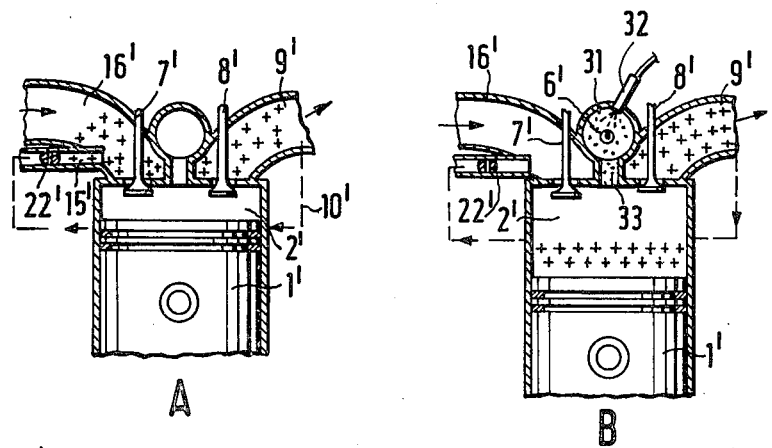
FIGS. 3a and 3b show the operating sequence at the beginning of the intake stroke and at the end of the intake stroke, in a second exemplary embodiment of the invention having fuel injection into an ignition chamber.

This fuel delivery into the ignition chamber can also be effected during the second portion of the intake stroke, thus separating the exhaust gas component of the charge from the fuel-air mixture component of the charge. Illustration A of FIG. 3 shows how exhaust gas (noted by the + signs) is delivered to the intake channel 16' via the partial line 15' under the control of the rotary slide 22' and then pre-stored upstream of the inlet valve 7'. The piston 1' is here located in its upper outset position. Illustration B of FIG. 3 shows the subsequent situation where the piston 1' is located in its lower extreme position; the stratification of the metered exhaust gas over the piston bottom is indicated by the crosses.

In combination with a suitable combustion chamber embodiment, it is possible by means of the embodiment according to the invention to attain a substantial increase in the exhaust recirculation rate compared with conventional systems. Particularly in internal combustion engines which aspirate a fuel-air mixture and have externally-supplied ignition, there are smaller intake throttle losses, so that fuel consumption is reduced, especially in the partial-load range. In general, in engines driven in this manner, the increased rate of exhaust gas recirculation results in the reduction of toxic emissions.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A device for admitting exhaust gases and fuel-air mixtures into each cylinder of an internal combustion engine comprising a combustion chamber, an inlet port connecting with said combustion chamber, an inlet valve in said inlet port, an intake channel communicating with said inlet port, an exhaust outlet channel communicating with said combustion chamber, an exhaust valve in an opening to said exhaust outlet channel, an exhaust recirculation line connected at one end to said exhaust outlet channel and at its other end to said intake channel, an exhaust throttle valve in said exhaust circulation line, for varying the flow passage of the exhaust recirculation line, a passage control device within said exhaust circulation line downstream of said exhaust throttle valve and controlled in synchronism with rotation of a crankshaft of said engine, whereby the passage control device is controlled such that exhaust gases from said exhaust circulation line are permitted to flow into the intake channel only within the period of time during which said inlet valve is closed in order to pre-store exhaust gases therein.

2. A device as defined by claim 1, wherein said exhaust gas pre-stored in the intake channel is aspirated into the combustion chamber during a first portion of an intake stroke and the introduction of a fuel-air mixture is effected during a second portion of the intake stroke, the quantity of the pre-stored exhaust gas determining the onset of the intake of said fuel-air mixture.

3. A device as defined by claim 2, comprising an ignition chamber opening into said combustion chamber, whereby fuel injected into said ignition chamber leads away from the upper portion of the combustion chamber.

4. A device as defined by claim 2, comprising a fuel injection valve, said fuel injection valve is operative in a time-controlled manner to inject fuel into the air flowing through the inlet valve to the combustion chamber.

5. A device as defined by claim 4, comprising an annular sleeve in said inlet channel, an annular passage surrounding a portion of said annular sleeve, said fuel injection valve disposed relative to said sleeve in said intake channel such that the fuel to be injected from said fuel injection valve proceeds past the annular passage surrounding said sleeve past said valve and directly into the combustion chamber of the engine.

6. A device as defined by claim 5, wherein said exhaust recirculation line discharges into said annular passage surrounding said annular sleeve which discharges into the intake channel.

7. A device as defined by claim 6, wherein said annular sleeve extends coaxially relative to the intake channel and the annular passage surrounding said annular sleeve is formed between the outer jacket of said annular sleeve and the wall of the intake channel, and the upstream end of said annular sleeve is firmly connected on its outer circumference with the intake channel.

* * * * *